United States Patent [19]

Nakagawa

[11] Patent Number: 5,978,897
[45] Date of Patent: Nov. 2, 1999

[54] SEQUENCE OPERATION PROCESSOR EMPLOYING MULTI-PORT RAMS FOR SIMULTANEOUSLY READING AND WRITING

[75] Inventor: Teruo Nakagawa, Aichi, Japan

[73] Assignee: Mitsubishi Denki Kabushiki Kaisha, Tokyo, Japan

[21] Appl. No.: 08/070,296

[22] Filed: Jun. 2, 1993

[30] Foreign Application Priority Data

Jun. 2, 1992 [JP] Japan .................................... 4-141677

[51] Int. Cl.[6] ...................................................... G06F 12/00
[52] U.S. Cl. ................................ 712/200; 712/1; 711/149
[58] Field of Search .................................. 395/800, 375, 395/550; 365/230.05

[56] References Cited

U.S. PATENT DOCUMENTS

| | | | |
|---|---|---|---|
| 4,639,866 | 1/1987 | Loo | 395/550 |
| 5,001,665 | 3/1991 | Gergen et al. | 395/400 |
| 5,036,491 | 7/1991 | Yamaguchi | 365/189.07 |
| 5,062,081 | 10/1991 | Runaldue | 365/230.05 |
| 5,111,431 | 5/1992 | Garde | 365/189.02 |
| 5,123,108 | 6/1992 | Olson et al. | 395/800 |

Primary Examiner—Meng-Al T. An
Assistant Examiner—Walter D. Davis, Jr.
Attorney, Agent, or Firm—Sughrue, Mion, Zinn, Macpeak & Seas, PLLC

[57] ABSTRACT

A sequence operation processor and a sequence operation processing method for processing sequence operations at high speed using a multi-port RAM. The sequence operation processor reads data from the multi-port RAM and performs operations as instructed. An operation result which is to be written into RAM is stored in a data register and in a desired address of the multi-port RAM. If the next sequence operation requires that a different address in the multi-port RAM be read, the sequence operation processor writes the operation result to the previously desired address and simultaneously reads the data corresponding to the designated address of the next sequence operation. If, on the other hand, an address where the sequence operation result is to be written is identical to the address from which data used for the next sequence operation is to be read, the sequence operation processor writes the operation result to the multi-port RAM, and reads the data required for the next sequence operation from the data register.

10 Claims, 9 Drawing Sheets

SEQUENCE OPERATION PROCESSOR EMPLOYING MULTI-PORT RAMS FOR SIMULTANEOUSLY READING AND WRITING

BACKGROUND OF THE INVENTION

1. Field of the Invention

The present invention relates to a sequence operation processor used to execute a plurality of sequence operations. More specifically, the invention is directed to a sequence operation processor and a sequence operation processing method which employs multi-port RAMs for storing operation data to increase the speed of an operation execution cycle.

2. Description of the Background Art

Figure 10:
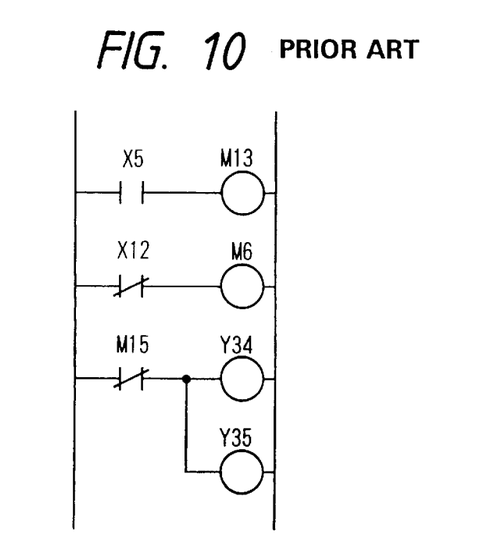
FIG. 10 illustrates a ladder program.

A sequence processing apparatus, also known as a "programmable logic controller (PLC)," is widely used with machine tools, industrial machines, and the like. The sequence operation processing apparatus executes operations in accordance with a sequence set forth in a program format such as a "ladder program." Such a program is shown in FIG. 10, wherein logical relay contacts X5, X12, and M15 respectively correspond to logical relay coils M13, M6, and Y34 and Y35. Each of the relay coils M13, M6, Y34 and Y35 represents 1-bit data.

In the sequence operation processor, the ladder program is executed by using the following operations:

| Instruction | Device | Processing Time |
| --- | --- | --- |
| LD | X5 (contact input) | t1 |
| OUT | M13 (coil output) | t1 + t2 |
| LDI | X12 (contact input) | t1 |
| OUT | M6 (coil output) | t1 + t2 |
| LDI | M15 (contact input) | t1 |
| OUT | Y34 (coil output) | t1 + t2 |
| OUT | Y35 (coil output) | t1 + t2 |

Figure 8:
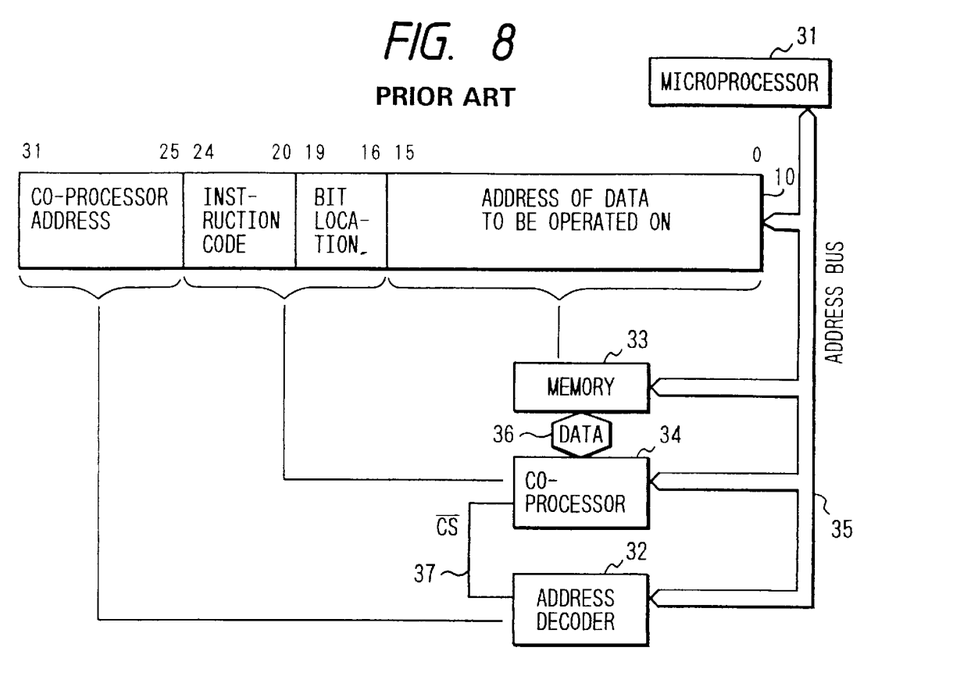
FIG. 8 illustrates a sequence operation processing apparatus known in the art.
Figure 9:
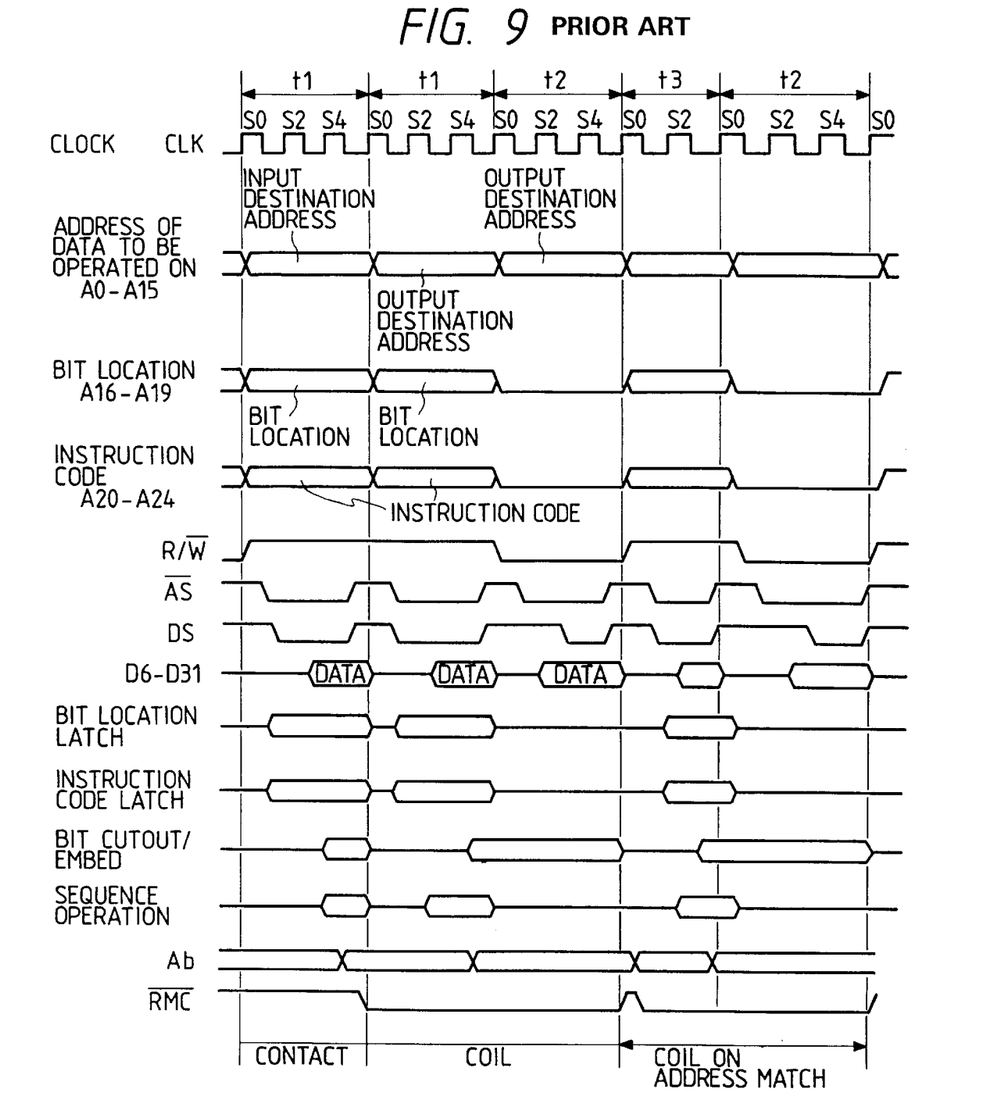
FIG. 9 illustrates the operation timing diagram of the sequence operation processing apparatus shown in FIG. 8.

A known sequence operation processor described in Japanese Patent Publication No. 304570/1989 is shown in FIG. 8. As shown in FIG. 8, the sequence operation processor includes a microprocessor 31 for controlling an address decoder 32, a memory 33, and a co-processor 34. The sequence operation processor performs the sequence of operations set forth above in accordance with the timing chart shown in FIG. 9. For example, when the operation of the contact input X5 (instruction LD) is performed, microprocessor 31 outputs a 32-bit instruction word to a first bus 35. As shown in FIG. 8, the seven most significant bits of the 32-bit word designate the co-processor address, the next five significant bits designate the instruction code (e.g., LD, OUT, etc.), the next four significant bits designate the bit location, and the remaining sixteen least significant bits designate the address of the data to be operated on. When the address decoder 32 detects the co-processor address from the instruction word appearing on first bus 35, address decoder 32 outputs a chip select (CS) signal 37 to the co-processor 34, thereby causing the bit location and the instruction code fields to be latched. The co-processor 34 then reads data from memory 33 corresponding to the address field in the instruction word, and executes a bit operation. Similarly, when the coil output operation M13 (instruction OUT) is executed, data read from memory 33 is operated on by the co-processor 34 and the operation result is written into memory 33. In the foregoing description, assuming that t1 is the data read time of the memory 33 and t2 is the data write time, the total time necessary to process the ladder program shown in FIG. 10 is (7×t1+4×t2).

Figure 11:
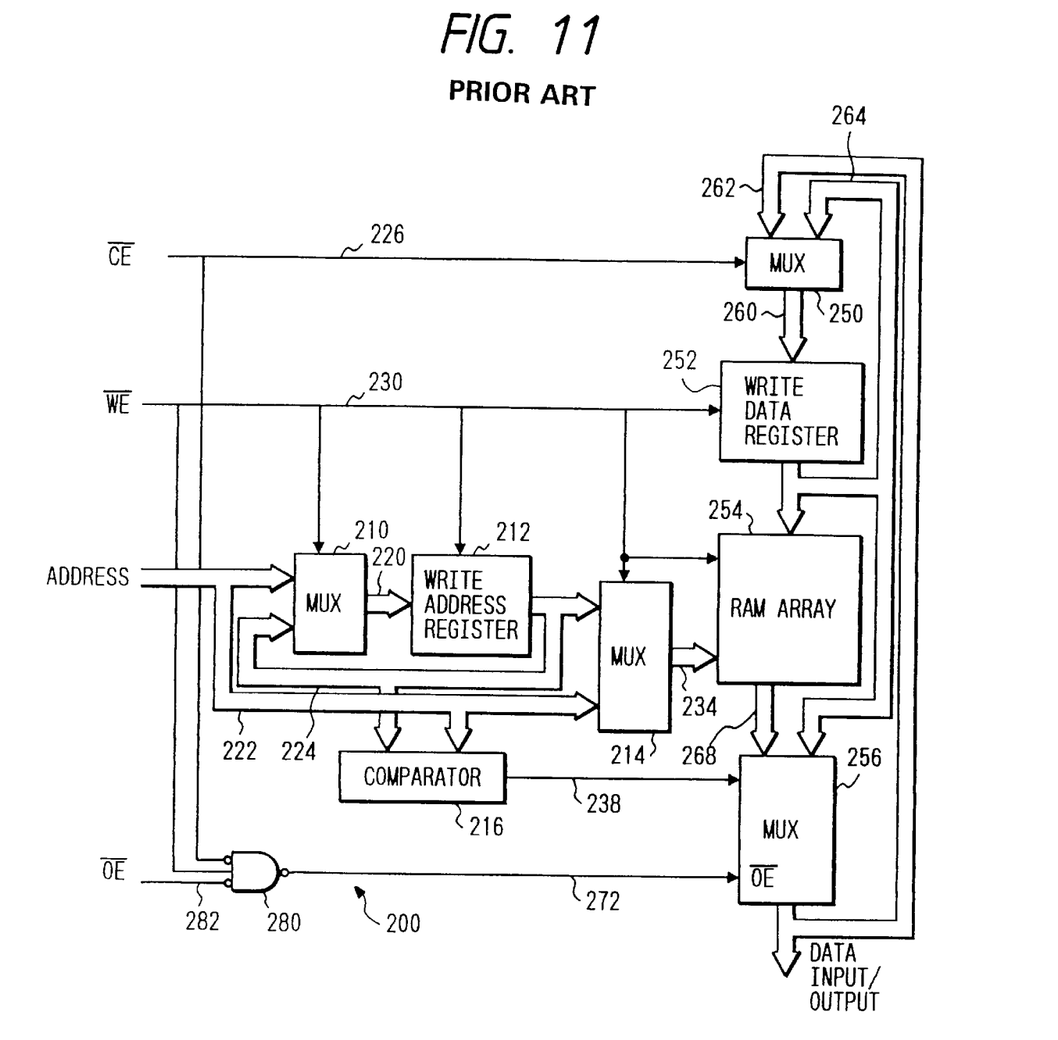
FIG. 11 illustrates the arrangement of a RAM known in the art.

In order to perform faster processing of a ladder program, Japanese Patent Publication No. 113492/1990 discloses a RAM which allows the data read time t1 to be shortened. This RAM is shown in FIG. 11 and includes a multiplexer 210 for multiplexing an external address bus 222 and an internal address bus 224 to produce an output on a bus 220. The output appearing on bus 220 is stored in a write address register 212 which outputs data on the address bus 224 for input to a multiplexer 214. Multiplexer 214 also selects between external address bus 222 and internal address bus 224 to produce an output on address bus 234. A RAM array 254 receives the output from address bus 234 under control of a write enable signal 230. A comparator 216 is used to compare the address on external address bus 222 with the address on internal address bus 224, and for outputting an address match signal 238 upon detecting a match between the addresses. A multiplexer 250 selects either external data bus 262 or internal data bus 264 under control of chip enable signal 226, thereby providing an output to bus 260. The RAM further includes a write data register 252, a data bus 268 coupled to RAM array 254, and a multiplexer 256 for selecting between data bus 268 and internal data bus 264 depending on the state of the output enable signal 272 and the state of the address match signal 238, thereby providing an output to the external data bus 262.

The operation of the sequence operation processor is similar to the operation described above, except in the instance when the address field in the 32-bit instruction word specified for a new sequence operation is identical to the address field in a preceding sequence operation (e.g., preceding coil output operation). In such a case, the content of the write address register 212 (having been stored during the previous coil output operation) is identical to the content on the external data bus 222 (FIG. 11). Hence, the comparator 216 outputs the address match signal 238, thereby causing the multiplexer 256 to output the information stored in the write data register 252 as output data on internal data bus 264, instead of outputting information stored in RAM array 254 as output data on bus 268. Since the data is read from the write data register 252 rather than from RAM array 254, the data processing of the instruction can be performed in a time t3 which is shorter than the ordinary read time t1 (i.e., the time if the data is read from the RAM array 254). Thus, a coil output operation can be executed in a time (t3+t2) which is shorter than the time (t1+t2). Although the time (t3+t2) achieved by implementing the RAM of FIG. 11 in the sequence operation processor of FIG. 8 is shorter than time (t1+t2), the coil output operation is still limited to the steps of reading data from a memory or a write data register, then executing an operation with the read data, and subsequently writing the operation result back to the memory. Accordingly, such an operation can not be executed in any time shorter than either (t1+t2) or (t3+t2).

SUMMARY OF THE INVENTION

Accordingly, it is an object of the present invention to overcome the disadvantages in the prior art by providing a sequence operation processor and a sequence operation processing method which employs a multi-port RAM as a data memory for sequence operation execution to reduce the write time of coil output operations, and the like, to the data memory, thereby increasing the speed of an operation execution cycle.

In accordance with the invention, the sequence operation processor simultaneously performs a read operation of reading data from the multi-port RAM and a write operation of writing an operation result to the multi-port RAM. Specifically, when an input address in an instruction is identical to an output address of another instruction, the sequence operation processor simultaneously writes the result to the multi-port RAMs, and reads data from an internal data register, thereby processing the data at high speed. According to the invention, if an address where a sequence operation result is to be written is different from an address from which data used for a next sequence operation is to be read, then the sequence operation processor writes the operation result to one port of the multi-port RAM and simultaneously reads the data employed for the next sequence operation from another port thereof, and inputs the read data to the appropriate operation circuit.

These and other objects and advantages are achieved according to the present invention which is described in detail below and which is shown in the attached drawings.

DESCRIPTION OF THE PREFERRED EMBODIMENTS

Figure 1:
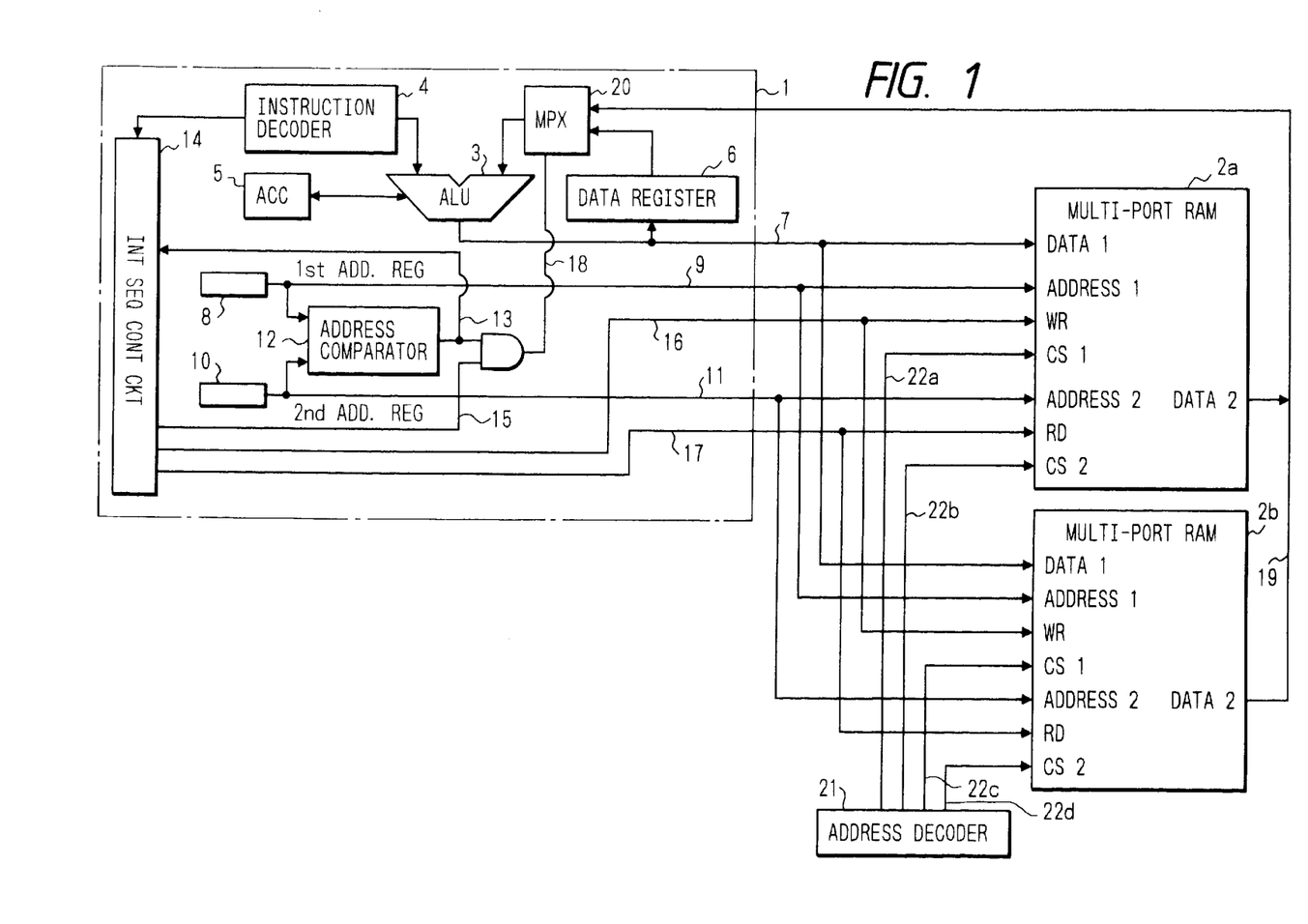
FIG. 1 illustrates a sequence operation processor according to a preferred embodiment of the present invention.

A first embodiment of the present invention will now be described with reference to FIG. 1. As shown in FIG. 1, a sequence operation processor 1 is coupled to multi-port RAMs 2a and 2b. The sequence operation processor 1 includes an operation circuit, e.g., an arithmetic logic unit (ALU) 3 which performs operations on data according to the output from instruction decoder 4, and a selector (multiplexer) 20. The ALU 3 stores the operation results in an accumulator 5, in a data register 6 and in multi-port RAMs 2a and 2b via a first data bus 7, as will be described in more detail herein. The sequence operation processor 1 further includes a first address register 8 which holds an address used to access the multi-port RAMs 2a,2b via a first address bus 9 when data is to be written to a specific address in the multi-port RAMs 2a and 2b. A second address register 10 stores an address of data to be read from the multi-port RAMs 2a and 2b as accessed via a second address bus 11 during a sequence operation. An address comparator 12 compares the address contained on first address bus 9 with that on the second address bus 11, and outputs an address match signal 13 upon detecting that the addresses on the two buses 9 and 11 are identical to each other. An internal sequence control circuit 14 outputs a data register valid signal 15, together with a write signal 16 and read signal 17 to the multi-port RAMs 2a and 2b under the control of the address match signal 13 and a decode signal from instruction decoder 4. An AND gate 13a receives the output of comparator 12 and the data register valid signal 15, and if the address match signal 13 and the data register valid signal 15 are both valid, the AND gate 13a generates a data select signal 18 in order to control selector 20 to select the content of the data register 6 for output to the ALU 3. An address decoder 21 is coupled to the multi-port RAMs 2a,2b for outputting chip select signals 22a, 22b, 22c and 22d thereto.

Figure 2:
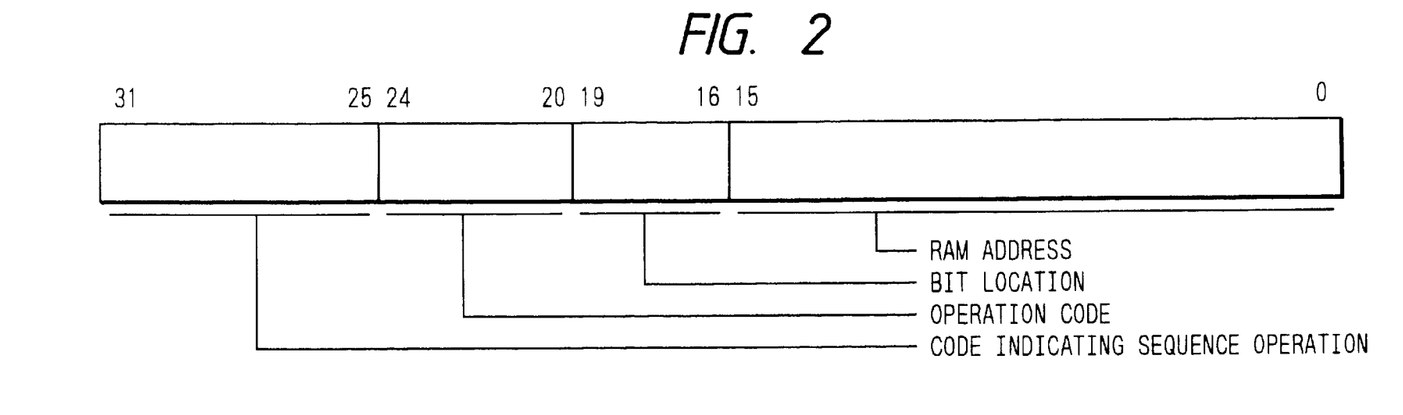
FIG. 2 illustrates an instruction code for the sequence operation processor according to the present invention.

The sequence operation processor of the present invention executes the ladder program shown in FIG. 10 by performing a series of sequence operation instructions having the format shown in FIG. 2. As shown in FIG. 2, the seven most significant bits designate the specified sequence operation instruction. The following five bits indicate the type of sequence operation to be performed, e.g., an LD instruction or an OUT instruction. The next four bits represent the bit location of data to be processed. The remaining sixteen bits correspond to the storage address of the data used in the sequence operation. When the sequence operation is executed, the sixteen most significant bits are stored in the instruction decoder 4 (FIG. 1) and the sixteen least significant bits are stored in the second address register 10.

When the ladder program of FIG. 10 is executed using the sequence operation processor of the present invention, the first sequence operation instruction corresponding to contact input X5 (instruction LD) is stored into the instruction decoder 4 and the second address register 10, as described above. In response to the instruction, the instruction decoder 4 transmits a decode signal to the internal sequence control circuit 14. In response to the transmitted decode signal, control circuit 14 outputs read signal 17 to the multi-port RAMs 2a and 2b with predetermined timing. In addition, internal sequence control circuit 14 transmits the address stored in the second address register 10 to both the address decoder 21 and the multi-port RAMs 2a and 2b. In response to this address, the address decoder 21 outputs chip select signal 22a to the multi-port RAM 2a which causes the information stored in RAM 2a at that address to be output to second data bus 19. During this time, if the address stored in the second address register 10 is different from the address held in the first address register 8, the address match signal 13 is not output from the address comparator 12, and the data register valid signal 15 from the internal sequence control circuit 14 is made invalid. As a result, the data select signal 18 causes the selector 20 to select the data appearing on the second data bus 19 (i.e., the output of the multi-port RAM 2a) for output to the ALU 3. At this time, the content of the second address register 10 is copied to the first address register 8.

During the next sequence operation cycle, the coil output M13 (instruction OUT) is stored in the instruction decoder 4 and the second address register 10, as described above. Similar to the execution of the LD X5 instruction described above, data from the multi-port RAM 2b is selected and the sequence operation is carried out.

Figure 3:
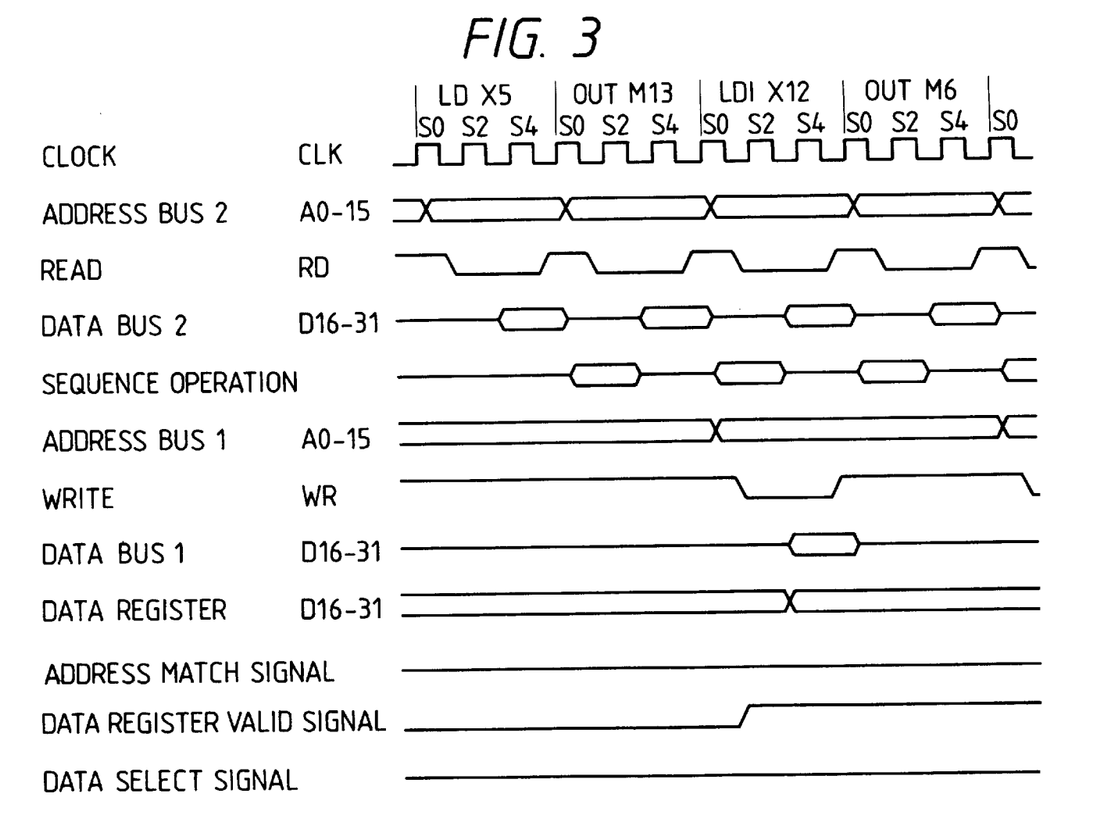
FIG. 3 illustrates an operation timing diagram where a read address of a sequence operation and a write address are different.

During the next sequence operation cycle, the LDI X12 instruction is stored in the instruction decoder 4 and the second address register 10. At this time, the operation result output from ALU 3 is written to both data register 6 and multi-port RAM 2b as specified in the first address register 8. Further, during the time that data is written to the data register 6 and multi-port RAM 2b, data is read from multi-port RAM 2a in accordance with the address specified in the second address register 10. Since the content of the first address register 8 is different from the content of the second address register 10, the address match signal 13 from address comparator 12 is held invalid, as shown in FIG. 3. As a result of address match signal 13 being invalid, the data select signal 18 is also invalid. Accordingly, the selector 20 operates to select the data appearing on the second data bus 19 (FIG. 1) which has been output from multi-port RAM 2a as the data input to the operation circuit 3.

The execution of the subsequent instruction OUT MG is similar to the execution of other instructions described above and therefore are not described in detail herein. FIG. 3 is a timing diagram where read and write addresses of the sequence operation are different from each other (i.e., when addresses in registers 8 and 10 are different from each other). The execution of the LDI M15 instruction is different from the other instructions, and therefore will now be described.

Figure 4:
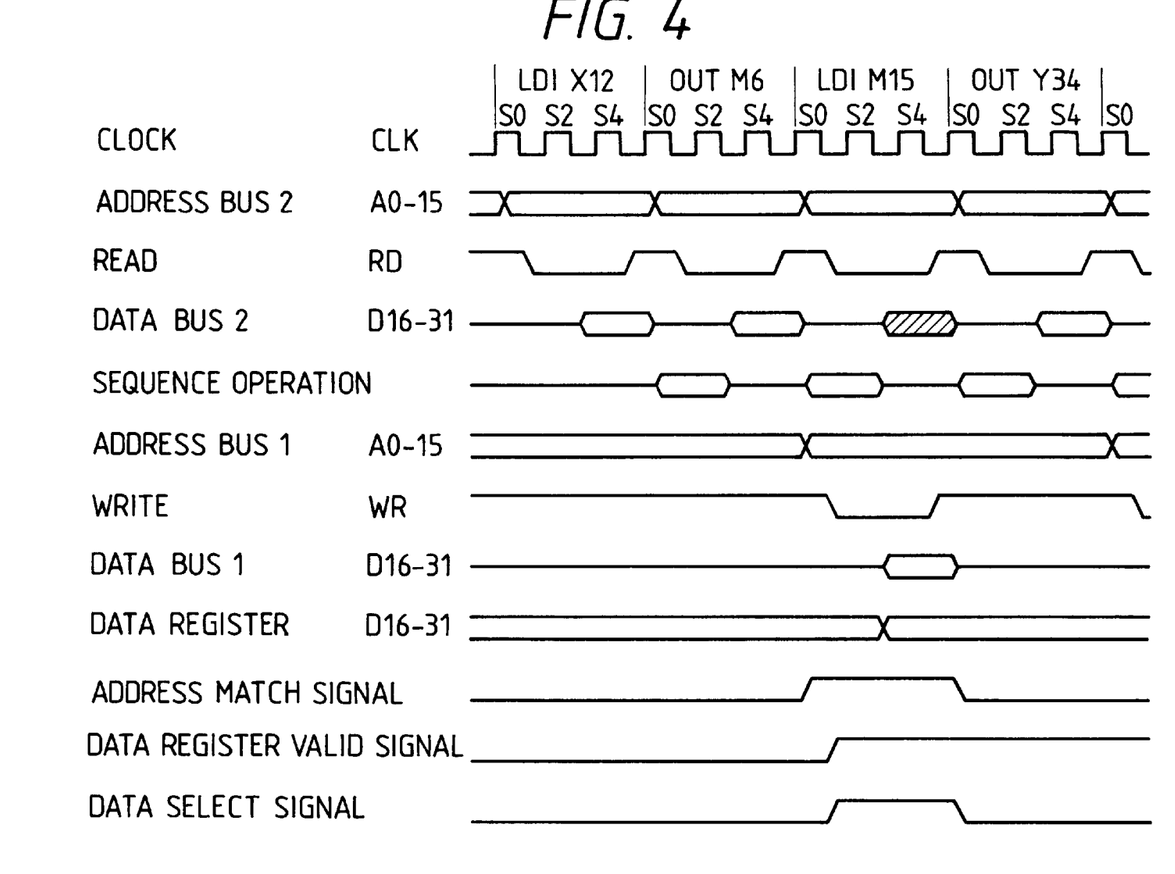
FIG. 4 illustrates an operation timing diagram where a read address for a sequence operation and a write address for a subsequent sequence operation are identical.

The LDI M15 instruction follows the OUT M6 instruction. During the operation cycle of the LDI M15 instruction, the operation result output from ALU 3 during the previous OUT M6 instruction is written to the address of the multi-port RAM 2b specified in first address register 8, and the result is also simultaneously stored in the data register 6. Since the content of the first address register 8 is equal to that of the second address register 10, the address match signal 13 from address comparator 12 is made valid. As a result, the data register valid signal 15 is also made valid after the execution of the out M6 instruction, as shown in the timing diagram of FIG. 4. Due to this match, the data select signal 18 is output to cause selector 20 to select the content of the data register 6 for output to ALU 3 and a sequence operation is thus performed. Accordingly, a simultaneous read and write operation is performed even though the address of the data to read is the same address of the data to be written. This is because the read operation involves reading the data stored in data register 6 rather than from multi-port RAM 2a or 2b. The operation instructions OUT Y34 and OUT Y35 are executed in a similar manner as that described above.

In accordance with the present invention thus described, the multi-port RAMS 2a, 2b and the data register 6 allow for a simultaneous read and write operation, even when the address of the data to be read is the same address as the data to be written. Therefore, coil output operations can be executed in a much shorter time than the conventional read time t1 or the conventional write time t2 since the read and write operations are simultaneously performed, thereby ensuring faster processing of operation instructions for the ladder program. The present invention is an improvement over prior art systems such as that shown in Japanese Patent Publication No. 113492/1990 (discussed above) in that the present invention employs multi-port RAMs which allow for simultaneous read and write operations when the address of the data to be read is not the same address of the data to be written. Further, with the present invention, the sequence operation processor 7 includes the data register 6, the address comparator 12 and other circuits, rather than connecting these circuits in the memory circuit. If these circuits are connected in the memory circuit, rather than including them in the sequence operation processor as in the present invention, execution of the LDI M15 instruction following the OUT M6 instruction causes signal delays due to the input and output buffers of the sequence operation processor, the wiring capacity of the sequence operation processor, and the input and output buffers of the memory circuits. Such signal delays are especially problematic when a large number of memory circuits are employed since the wiring capacity of such memory circuits increases. Further, the sequence processor of the present invention may be used with several memory circuits (i.e., multi-port RAMS), whereas the known systems require a number of address comparators, data registers, write address registers and multiplexers corresponding to the number of memory circuits, thereby increasing the costs of the system.

Figure 5:
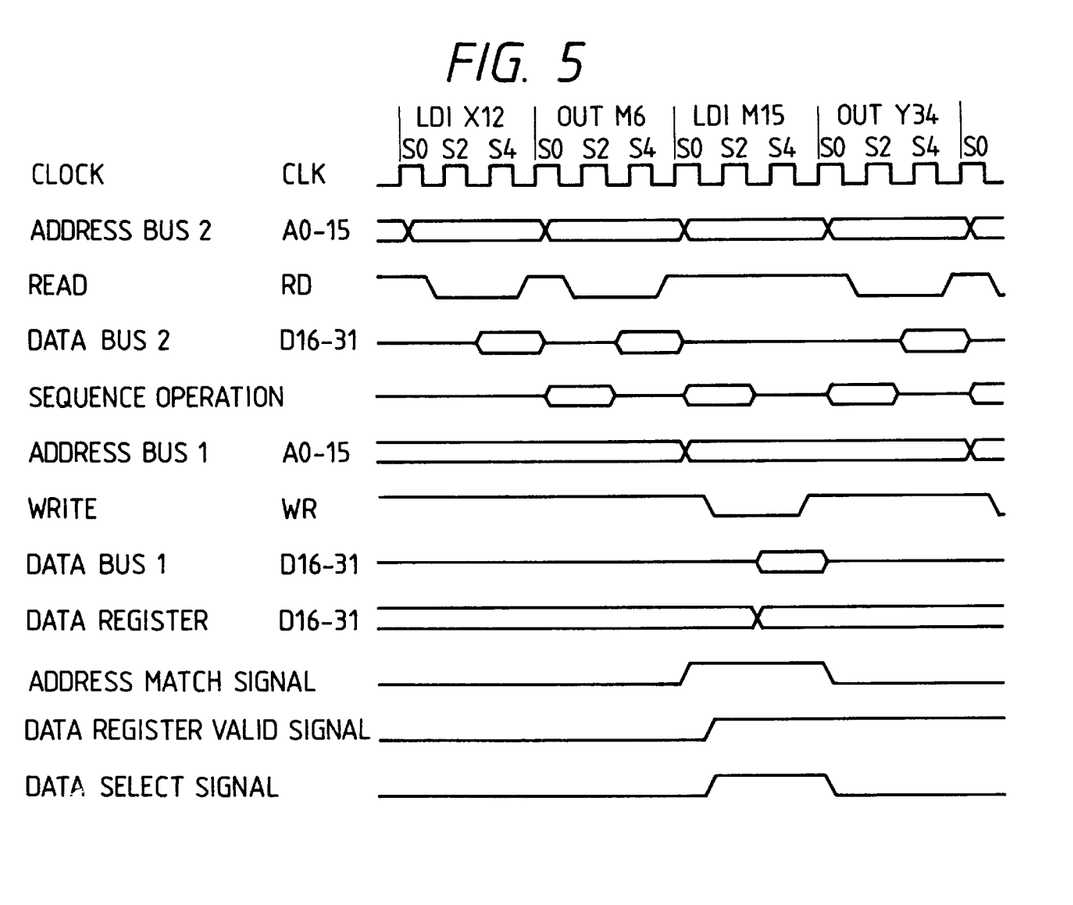
FIG. 5 illustrates an operation timing diagram where a read address for a sequence operation and a write address for a subsequent sequence operation are identical as executed by a sequence operation processor according to another embodiment of the present invention.

With the present invention, the address comparator 12, data register 6 and other circuits are provided in the sequence operation processor and therefore are not influenced by the signal delays attendant with the known systems. As a result, the multi-port RAMs of the invention may be of the type which have a relatively low operating speed, thereby lowering the cost of the system. Moreover, in the present invention, when the multi-port RAMs 2a, 2b are disabled for contention of read and write addresses, the write signal 16 is made valid and the read signal 17 is made invalid as shown in the timing diagram of FIG. 5, whereby the addresses are matched, the read operation is forced to be invalid, and the content of the data register is employed for the read operation instead of reading data from the multi-port RAMs 2a, 2b. In this case, i.e., when the read address and the write address are identical, a first arrival port is given priority and its access is accepted unconditionally. Accordingly, there is no need for arbitration or contention circuitry in the multi-port RAMs for deciding a contention between a read and write address access. Further, when the multi-port RAMs 2a, 2b have a port arbitration function which does not accept a second arrival port if that port is in a write mode until the access of the first arrival port ends, the read signal 17 is made valid to disable the port arbitration function. Accordingly, various multi-port RAMs can be employed with the present invention.

Figure 6:
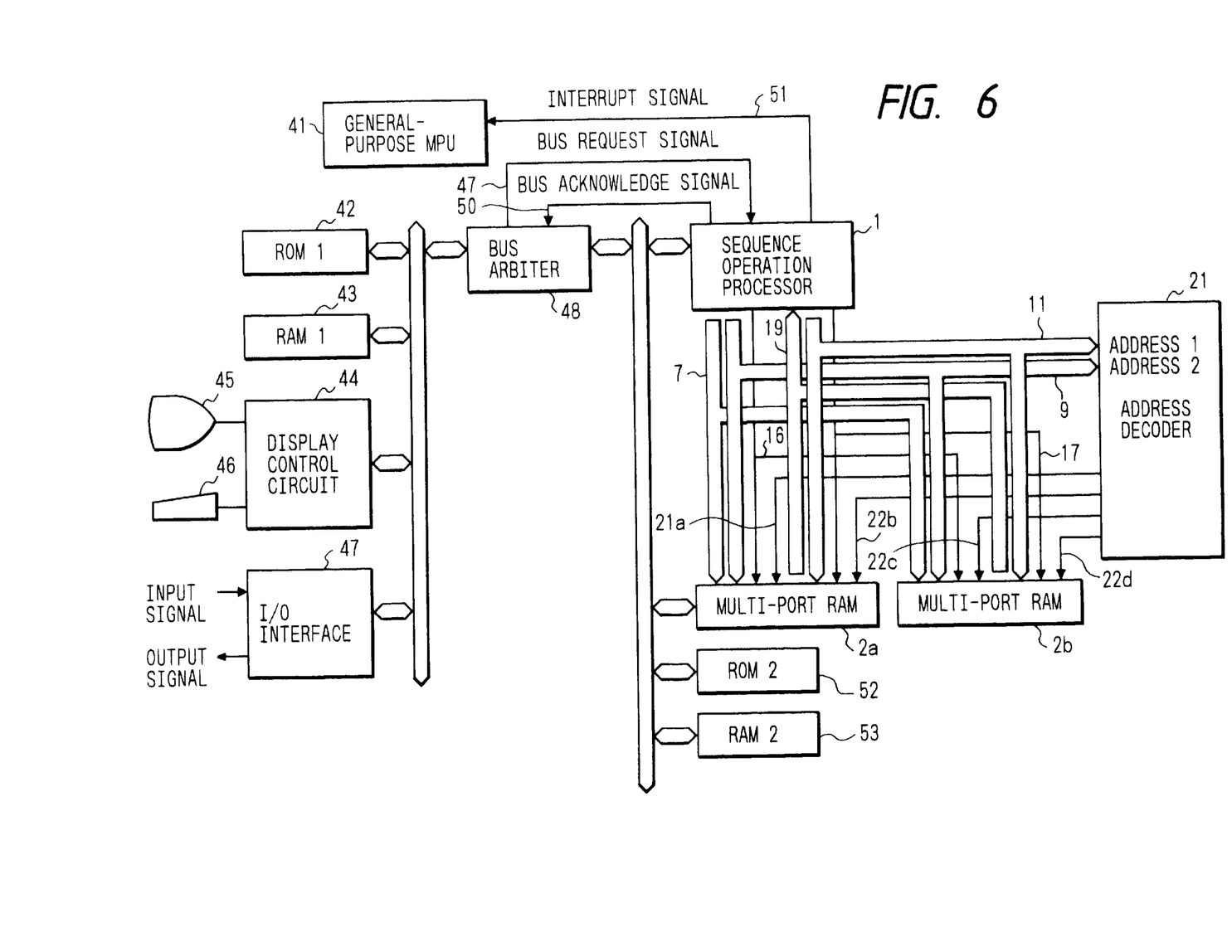
FIG. 6 illustrates a sequence operation processing apparatus according to another embodiment of the present invention.

In another embodiment of the present invention, the sequence operation processor may be configured in a system having a general-purpose processor (MPU) which executes logical and numerical operations other than the sequence operations, and performs function instruction processing as is required when using machine tools, industrial machines, and the like. As shown in FIG. 6, the system includes a general-purpose processor 41 which executes functions under the control of a program stored in first ROM 42. A first RAM 43 stores data, parameters, and the like, and a display device 45 displays such data under the control of display control circuit 44. An input device 46 is employed for inputting programs, data and the like, and an input/output interface 47 is employed to, for example, transmit signals for controlling machine tools, and the like, and for communicating with other systems.

A bus arbiter 48 controls the access to the system bus of the sequence operation processor 1. In order for the general-purpose processor 41 to access this bus, the processor 41 must first transmit an access request to the bus arbiter 48. In response to this access request, the bus arbiter 48 outputs a bus request signal 49 to the sequence operation processor 1. In response to the bus request signal 49, the sequence operation processor 1 outputs a bus acknowledge signal 50 to the bus arbiter 48 provided that the currently executed cycle is finished and the bus is ready to be released. Typically, the general-purpose processor 41 accesses the bus of the sequence operation processor 1 to perform function instructions that the sequence operation processor 1 cannot execute, or to process instructions associated with some error which has occurred. The sequence operation processor 1 notifies the general-processor 41 of such conditions by generating an interrupt signal 51. In this manner, the sequence operation processor 1 can devote much of its time to processing the sequence operations, thus high-speed processing can be achieved.

As discussed above, the sequence operation processor 1 performs the necessary instructions to execute the ladder program shown in, for example, FIG. 10. This operation program (ladder program) is stored in second ROM 52. The ROM 52 may be a nonvolatile memory such as a RAM having a battery backup, or an EEPROM. A second RAM 53 is used by the sequence operation processor 1 to store data for processing, such data typically requiring a temporary stack memory for the multiple subroutines performed by the sequence operation processor 1.

In operation, the sequence operation processor 1 reads an instruction from the second ROM 52, and executes the corresponding sequence operation immediately if the instruction decoded is one for which data of the multi-port RAMs 2a and 2b is required. However, if the read instruction is a function instruction or other instruction which is to be performed by the general-purpose processor 41, then the interrupt signal 51 is generated. As discussed above, when the general-purpose processor 41 receives the interrupt signal 51, the processor 41 transmits a bus request signal to the bus arbiter 48 to gain access to the system bus of the sequence operation processor 1. When the processing of the general-purpose processor 41 ends, the sequence operation processing performed by the sequence operation processor 1 is resumed.

Figure 7:
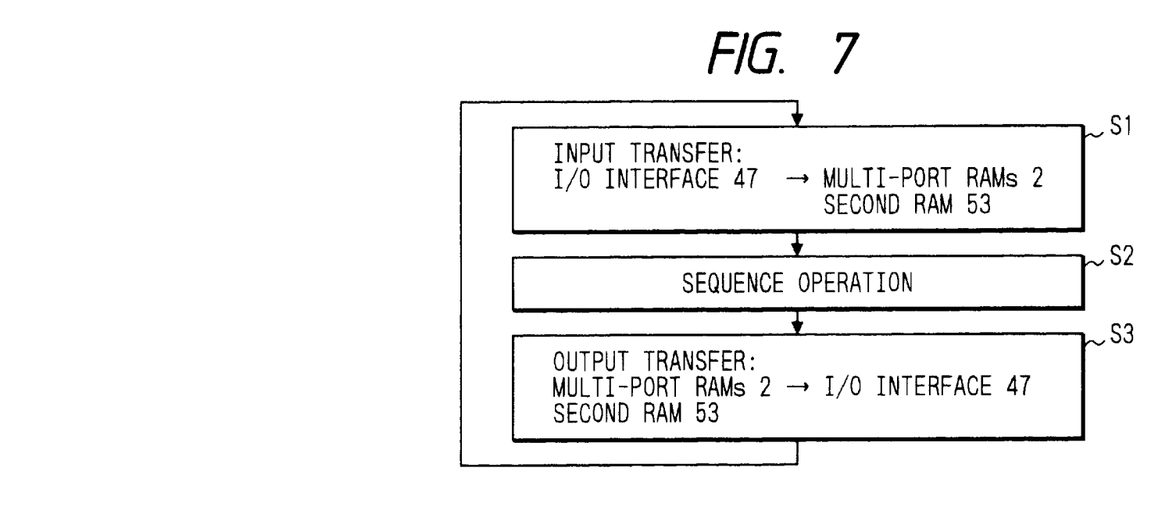
FIG. 7 illustrates a processing sequence of the sequence operation processing apparatus according to the present invention.

The operation of the system will now be described with reference to FIG. 7. In step S1, the general-purpose processor 41 reads input signals from the input/output interface 47. Data requiring rapid processing is written to the multi-port RAMs 2a and 2b, while data not requiring such rapid processing is written into second RAM 53. When writing data to the multi-port RAMs 2a and 2b, the general-purpose processor 41, like the sequence operation processor 1, sets the desired addresses of the multi-port RAMs in the first address register 8 of the sequence operation processor 1. Data written in the multi-port RAMs 2a and 2b is also written in the data register 6, and the data register valid signal 15 output from the internal sequence control circuit 14 of the sequence processor 1 is made valid. In step S2, the sequence operation processing is then executed on the basis of the data written in the multi-port RAMs 2a and 2b, or the second RAM 53 under the control of instructions read from second ROM 52 by the sequence operation processor 1. Operation results are written to the multi-port RAMs 2a and 2b or the second RAM 53 in a manner as described above. When all of the instructions are performed (i.e., the ladder program is fully executed), the general-purpose processor 41 reads the operation results from the multi-port RAMs 2a and 2b, and the second RAM 53, and then outputs the operation results via input/output interface 47 (Step 53).

In the preferred embodiments described above, the sequence operation processor 1 simultaneously performs the input of data from and the output of an operation result to the multi-port RAMs 2a and 2b. When an input address of an operation instruction is identical to an output address of another instruction, the sequence operation processor 1 simultaneously writes the result to the multi-port RAMs 2a and 2b, and reads data from the internal data register 6, thereby processing the data at high speed. This high-speed processing can be maintained by requiring non-sequence operations to be processed by a general-purpose processor or the like so that the processing time of the entire system can be greatly reduced.

It will be apparent that the present invention, as described above, achieves a sequence operation processor which can process data at high speed for execution of coil output operations, and the like. By comparing the read and write addresses for adjacent sequence operations in the above described manner, the sequence operation processor can resolve contention for the same memory address without using high speed memories and without using arbitration or contention circuitry as used in the prior art, thereby providing flexibility for. the system configuration. Furthermore, the cost of the entire system can be reduced, because only one set of an address comparator, a write address register, and a data register are needed in the sequence operation processor.

What is claimed:

1. A sequence operation processing apparatus for executing operation instructions, said processing apparatus comprising:

a multi-port RAM for storing data used during execution of the operation instructions;

a sequence operation processor, coupled to said multi-port RAM, for executing the operation instructions, said sequence operation processor including a comparator for comparing a first designated address of said multi-port RAM in a first operation instruction with a second designated address of said multi-port RAM in a second, subsequent operation instruction, and for generating a comparison signal indicating a result of said comparison, the second designated address of said multi-port RAM being read in response to said generated comparison signal indicating that said first and second designated addresses are not equal to each others wherein said sequence operation processor simultaneously writes data to the first designated address of the multi-port RAM and reads data from the second designated address of the multi-port RAM when said generated comparison signal indicates that said first and second designated addresses are not equal to each other.

2. The sequence operation processing apparatus as defined in claim 1, wherein said sequence operation processor further comprises:

a data register for storing data that is to be written into said multi-port RAM as a result of execution of the first operation instruction; and a selector, coupled to said data register, said comparator and to an output of said multi-port RAM, for selecting one of an output of said multi-port RAM and a content of said data register in accordance with said generated comparison signal, said sequence processor using data selected by said selector in executing operation instructions.

3. The sequence operation processing apparatus as defined in claim 2, wherein said se lector selects the content of said data register in response to said generated comparison signal indicating that said first and second designated addresses are equal to each other.

4. The sequence operation processing apparatus as defined in claim 2, wherein during a same execution cycle that said selector selects data from said data register, said sequence operation processor writes data to the first designated address of the multi-port RAM.

5. The sequence operation processing apparatus as defined in claim 4, wherein said execution cycle corresponds to a sequence operation that follows a coil output operation.

6. A method of processing sequence operations, the method comprising the steps of:
   comparing a designated address in a first operation instruction with a designated address in a second, subsequent operation instruction;
   generating a comparison signal in response to a favorable comparison of the designated addresses;
   storing data in a data register, said data being concurrently stored in a multi-port random access memory (RAM);
   selecting output data from one of the data register and the multi-port RAM in response to the comparison signal of said generating step, wherein data is output from the data register in a same execution cycle as data is stored in the multi-port RAM when the comparison signal indicates that the designated addresses of the first and second operation instructions are equal, and wherein data is output from the multi-port RAM at the same time data is stored in the multi-port RAM when the comparison signal indicates that the designated addresses of the first and second operation instructions are not equal.

7. The sequence operation processing apparatus as defined in claim 6, wherein said execution cycle corresponds to a sequence operation that follows a coil output operation.

8. A sequence operation processor for carrying out sequence operations, said processor comprising:
   at least one multi-port RAM having first and second address ports;
   a first address register for holding an address corresponding to the first address port of said at least one multi-port RAM;
   a second address register for holding an address corresponding to the second address port of said at least one multi-port RAM;
   an address comparator for comparing a content of said first address register with a content of said second address register for outputting an address match signal if the addresses are equal;
   a data register for holding data written to said at least one multi-port RAM; and
   an internal sequence control circuit for transmitting a data register valid signal, a read signal, and a write signal to said multi-port RAM in response to a sequence operation under control of the address match signal and a decode signal from an instruction decoder;
   wherein when the sequence operation is executed, one of data read from the at least one multi-port RAM and a content of said data register is selected and input to an operation circuit in accordance with the address match signal from said address comparator and the data register valid signal at the same time as data is stored in said at least one multi-port RAM.

9. The sequence operation processor as recited in claim 8, further comprising a general purpose processor, and wherein when writing data to said at least one multi-port RAM with said sequence operation processor bypassed, said general-purpose processor sends the data to said at least one multi-port RAM by setting the write address of the data to one of said address registers in the sequence operation processor and also sends the data to be written to said multi-port RAM to said data register, and thereafter the sequence operation processor performs sequence operation processing and said general-purpose processor carries out other non-sequence operation processing.

10. The method of processing sequence operations, as defined in claim 8, wherein said data is read from said multi-port RAM at the same time data is stored in said multi-port RAM during a sequence operation that follows a coil output operation.

* * * * *